United States Patent
Reistad et al.

(10) Patent No.: US 7,975,007 B2
(45) Date of Patent: *Jul. 5, 2011

(54) METHOD AND SYSTEM FOR FACILITATING MARKETING DIALOGUES

(75) Inventors: Brian Reistad, Sudbury, MA (US); William D. Snapper, Holliston, MA (US); Andrew C. Payne, Lincoln, MA (US); James Campbell, Watertown, MA (US)

(73) Assignee: Vignette Software LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/546,981

(22) Filed: Aug. 25, 2009

(65) Prior Publication Data

US 2009/0313328 A1   Dec. 17, 2009

Related U.S. Application Data

(63) Continuation of application No. 11/818,192, filed on Jun. 13, 2007, now Pat. No. 7,647,372, and a continuation of application No. 11/353,792, filed on Feb. 14, 2006, now Pat. No. 7,389,320, and a continuation of application No. 09/621,913, filed on Jul. 24, 2000, now Pat. No. 7,127,486.

(51) Int. Cl.
*G06F 15/16* (2006.01)
(52) U.S. Cl. ......... 709/203; 709/206; 709/217; 709/219
(58) Field of Classification Search .................. 709/227, 709/228, 203, 217, 219, 206; 379/202.01
See application file for complete search history.

(56) References Cited

U.S. PATENT DOCUMENTS

| | | | |
|---|---|---|---|
| 4,625,081 A | 11/1986 | Lotito et al. |
| 5,153,905 A | 10/1992 | Bergeron et al. |
| 5,646,982 A | 7/1997 | Hogan et al. |
| 5,802,299 A | 9/1998 | Logan et al. |
| 5,848,397 A | 12/1998 | Marsh et al. |
| 5,892,909 A | 4/1999 | Grasso |
| 5,937,037 A | 8/1999 | Kamel et al. |
| 5,937,162 A | 8/1999 | Funk et al. |
| 5,970,491 A | 10/1999 | Schreiber et al. |
| 6,073,142 A | 6/2000 | Geiger et al. |
| 6,076,101 A | 6/2000 | Kamakura et al. |
| 6,101,545 A | 8/2000 | Balcerowski et al. |
| 6,236,977 B1 | 5/2001 | Verba et al. |
| 6,304,550 B1 | 10/2001 | Fox |
| 6,332,164 B1 | 12/2001 | Jain |
| 6,351,745 B1 | 2/2002 | Itakura et al. |

(Continued)

FOREIGN PATENT DOCUMENTS

EP   0371607 A3   6/1990

(Continued)

OTHER PUBLICATIONS

International Search Report, mailed Nov. 10, 2003, for PCT/US01/21403.

(Continued)

*Primary Examiner* — Frantz B Jean
(74) *Attorney, Agent, or Firm* — Sprinkle IP Law Group

(57) ABSTRACT

Systems and methods for carrying on marketing dialogues are disclosed. Specifically, embodiments of the systems and methods presented may allow marketing dialogues to be carried on with a set of participants by sending a communication to each of the participants. Another set of participant may be assembled from the initial participants and an action may then be taken with respect to this second set of participants.

29 Claims, 13 Drawing Sheets

U.S. PATENT DOCUMENTS

| | | |
|---|---|---|
| 6,446,113 B1 | 9/2002 | Ozzie et al. |
| 6,571,238 B1 | 5/2003 | Pollack et al. |
| 6,701,322 B1 | 3/2004 | Green |
| 6,732,185 B1 | 5/2004 | Reistad |
| 6,854,007 B1 | 2/2005 | Hammond |
| 6,965,870 B1 | 11/2005 | Petras et al. |
| 6,965,920 B2 | 11/2005 | Pedersen |
| 7,003,517 B1 | 2/2006 | Seibel et al. |
| 7,092,821 B2 | 8/2006 | Mizrahi et al. |
| 7,127,486 B1 | 10/2006 | Reistad et al. |
| 7,277,863 B1 | 10/2007 | Hilerio et al. |
| 7,284,066 B1 | 10/2007 | Philyaw et al. |
| 7,346,655 B2 | 3/2008 | Donoho et al. |
| 7,389,320 B2 | 6/2008 | Reistad et al. |
| 7,647,372 B2 | 1/2010 | Reistad et al. |
| 2001/0034723 A1 | 10/2001 | Subramaniam |
| 2001/0034769 A1 | 10/2001 | Rast |
| 2001/0042136 A1 | 11/2001 | Guedalia et al. |
| 2002/0032742 A1 | 3/2002 | Anderson |
| 2002/0046091 A1 | 4/2002 | Mooers et al. |
| 2002/0099812 A1 | 7/2002 | Davis et al. |
| 2005/0209914 A1 | 9/2005 | Nguyen et al. |
| 2006/0031412 A1 | 2/2006 | Adams et al. |
| 2006/0184557 A1 | 8/2006 | Pollack et al. |
| 2006/0224903 A1 | 10/2006 | Ginter et al. |
| 2008/0000812 A1 | 1/2008 | Reistad et al. |

FOREIGN PATENT DOCUMENTS

| | | |
|---|---|---|
| JP | 10065730 | 3/1998 |
| WO | WO 96/13013 | 5/1996 |
| WO | WO 99/52026 | 10/1999 |
| WO | WO 01/09799 | 2/2001 |
| WO | WO 01/69432 | 9/2001 |
| WO | WO 02/08938 | 1/2002 |

OTHER PUBLICATIONS

"IMA's Internet Exchange Messaging Server: Assuring Fast and Reliable Communications over the Net" Internet Exchange News, Online!, vol. 2, No. 2, Feb. 1999, pp. 1-4.

"OS/2 Office: Delayed Delivery for Mail Items", IBM Technical Disclosure Bulletin, IBM Corp., New York, U.S., Col. 34, No. 9, Feb. 1, 1992, pp. 381-382.

Borenstein, N., "Internet Multimedia Mail with MIME: Emerging Standards for Interoperability", IFIP Transactions C. Communications Systems, Elsevier Science B.V., Amsterdam, Netherlands, vol. C07, 1992, pp. 183-192.

"Auto-Elimination of Duplicate In-Basket Items in Electronic Mail" IBM Technical Disclosure Bulletin, IBM Corp., New York, U.S., vol. 36, No. 3, Mar. 1, 1993, pp. 403-405.

Office Action issued in U.S. Appl. No. 09/621,913, mailed Mar. 12, 2004, 6 pgs.

Office Action issued in U.S. Appl. No. 11/353,792, mailed Dec. 4, 2006, Reistad, 11 pgs.

Office Action issued in 11/353,792, mailed Aug. 10, 2007, Reistad, 11 pgs.

International Preliminary Examination Report, mailed May 4, 2006 for PCT/US01/21403, 5 pgs.

Office Action issued in U.S. Appl. No. 09/621,719, mailed Jul. 16, 2002, 8 pgs.

Office Action issued in U.S. Appl. No. 09/621,719 mailed Mar. 17, 2003, 9 pgs.

Office Action issued in U.S. Appl. No. 09/621,719 mailed Sep. 10, 2003, 9 pgs.

Office Action issued in U.S. Appl. No. 12/566,364 mailed Nov. 29, 2010, 9 pgs.

| Monitoring Console | New 394 | | | | | | | 396 Refresh |
|---|---|---|---|---|---|---|---|---|
| Dialog Name 310 | Status 370 | Total Conversations | Active Conversations | Emails Sent | Emails Opened | Question Responses | Links Clicked | Completed Conversation |
| ▲ Test Script 1.3 – migration testing = | Stopped | 0 | 0 | 0 | 0 | 0 | 0 | 0 |
| ▲ Test Script 1.3 – migration testing = | Paused | 10 | 0 | 0 | 0 | 0 | 0 | 0 |
| ▲ Test Script 1.2 – migration testing = | Running | 0 | 0 | 0 | 0 | 0 | 0 | 0 |
| ▲ Test Script 1.1 – migration testing = | Running | 0 | 0 | 0 | 0 | 0 | 0 | 0 |
| ▶ Customer Satisfaction Survey = | Running | 48 | 1 | 2 | 2 | 2 | 0 | 47 |
|     Purchase | | 1 | 0 | 0 | 0 | 0 | 0 | 1 |
|     Catalog Purchase | | 47 | 1 | 2 | 2 | 2 | 0 | 46 |
| ▲ New Dialog = | Running | 3 | 0 | 3 | 3 | 2 | 0 | 3 |
| ▲ test 42 = | Running | 5 | 0 | 0 | 0 | 0 | 0 | 4 |
| ▲ Test Script 1 (v.1.0) = | Running | 2 | 2 | 3 | 1 | 0 | 2 | 0 |
| ▲ Unit Test Script = | Running | 1 | 1 | 3 | 2 | 1 | 0 | 0 |
| ▲ Test Script 2 (v.1.0) = | In Design | – | – | – | – | – | – | – |
| ▲ Test Script 1 (v.1.1) = | In Design | – | – | – | – | – | – | – |
| Totals: | | 390 ⟶ 69 | 4 | 11 | 8 | 5 | 2 | 54 |

CONVERSATION

| CONVERSATION_ID DOUBLE 711 |
|---|
| SCRIPT_INSTANCE_ID DOUBLE (FK) 712<br>CONV_STATE TEXT(1) (FK) 713<br>CONVERSATION_SOURCE_ID DOUBLE 714<br>PARTICIPANT_ID DOUBLE (FK) 715<br>MODIFIED_USER DOUBLE 717<br>CREATE_USER DOUBLE 716<br>MODIFIED_DATE DATE 717<br>CURRENT_LABEL TEXT(40) 718<br>PRIORITY DOUBLE 719<br>CURRENT_INSTRUCTION_NUM DOUBLE 720<br>ORIGINAL_SOURCE_ID DOUBLE 721<br>PREVIOUS_CONV_ID DOUBLE 722<br>TEST DOUBLE 723<br>TRACE DOUBLE 724<br>CREATE_DATE DATE 716 |

710

CONV_PROPS

| CONVERSATION_ID DOUBLE (FK) 742<br>VAR_CODE DOUBLE (FK) 744 |
|---|
| VAR_VALUE TEXT(200) 746 |

740

CONV_WAIT

| CONVERSATION_ID DOUBLE (FK) 732<br>EVENT_UUID TEXT(60) 734<br>EVENT_HANDLER_PFX TEXT(5) 734 |
|---|
| NEXT_INSTRUCTION_LABEL TEXT(40) 736 |

LABELED_SCRIPTS

| SCRIPT_INSTANCE_ID DOUBLE (FK) 766 |
| LABEL TEXT(40) 767 |
| --- |
| CREATE_DATE DATE 768 |
| CREATE_USER DOUBLE 768 |
| MODIFIED_USER DOUBLE 769 |
| MODIFIED_DATE DATE 769 |

765

SCRIPT

| SCRIPT_INSTANCE_ID DOUBLE 751 |
| --- |
| SCRIPT_STATE TEXT(1) (FK) 752 |
| SCRIPT_GROUP_ID DOUBLE 753 |
| SCRIPT_REV_MAJOR DOUBLE 754 |
| SCRIPT_REV_MINOR DOUBLE 754 |
| SCRIPT_NAME TEXT(80) 755 |
| DESCRIPTION TEXT(255) 756 |
| START_DATE DATE 757 |
| STOP_DATE DATE 757 |
| CREATE_DATE DATE 758 |
| CREATE_USER DOUBLE 758 |
| MODIFIED_DATE DATE 759 |
| MODIFIED_USER DOUBLE 759 |

750

SCRIPT_SOURCE

| SCRIPT_INSTANCE_ID DOUBLE (FK) 771 |
| --- |
| XML TEXT(86) 772 |

770

SCRIPT_PROPS

| SCRIPT_INSTANCE_ID DOUBLE (FK) 761 |
| VAR_CODE DOUBLE (FK) 762 |
| --- |
| VAR_VALUE TEXT(200) 763 |

760

SCRIPT_REGULATOR

| SCRIPT_GROUP_ID DOUBLE 786 |
| SCRIPT_LABEL TEXT(40) 787 |
| --- |
| REGULATOR_CODE TEXT(1) (FK) 788 |
| LIMIT DOUBLE 789 |
| QUEUE DOUBLE 790 |
| CUTOFF_DATE DATE 791 |

785

MIGRATE

| MIGRATE_ID DOUBLE 776 |
| --- |
| FROM_SCRIPT_INSTANCE_ID DOUBLE (FK) 777 |
| TO_SCRIPT_INSTANCE_ID DOUBLE (FK) 778 |
| MIGRATION_STATUS TEXT(1) (FK) 779 |
| CREATE_DATE DATE 780 |
| CREATE_USER DOUBLE 780 |
| MODIFIED_USER DOUBLE 781 |
| MODIFIED_DATE DATE 781 |

INSTRUCTION

| INSTRUCTION_ID DOUBLE 811 |
|---|
| SCRIPT_OPERATION_ID DOUBLE (FK) 812<br>SCRIPT_INSTANCE_ID DOUBLE (FK) 813<br>LABEL TEXT(40) 814 |

810

INSTRUCTION_PROPS

| INSTRUCTION_ID DOUBLE (FK) 816<br>VAR_CODE DOUBLE (FK) 817 |
|---|
| VAR_VALUE TEXT(200) 818 |

815

SCRIPT_ENTRY_POINT

| INSTRUCTION_ID DOUBLE (FK) 821 |
|---|
| ENTRY_POINT_LABEL TEXT(40) 822 |

820

SCRIPT_OPERATION

| SCRIPT_OPERATION_ID DOUBLE 826 |
|---|
| SCRIPT_OPERATION_STATUS TEXT(1) (FK) 827<br>SCRIPT_OPERATION_NAME TEXT(200) 828<br>CLASS TEXT(200) 829<br>CREATE_DATE DATE 830<br>CREATE_USER DOUBLE 830<br>MODIFIED_DATE DATE 831<br>MODIFIED_USER DOUBLE 831 |

825

SCRIPT_OPERATION_PROPS

| SCRIPT_OPERATION_ID DOUBLE (FK) 836<br>VAR_CODE DOUBLE (FK) 837 |
|---|
| VAR_VALUE TEXT(200) 838 |

EVENT_META

| EVENT_META_ID DOUBLE 861 |
|---|
| EVENT_META_TYPE TEXT(1) (FK) 862
EVENT_NAME TEXT(80) 863
DESCRIPTION TEXT(80) 864
START_SCRIPT_IND TEXT(1) 865
CREATE_DATE DATE 866
CREATE_USER DOUBLE 866
MODIFIED_DATE DATE 867
MODIFIED_USER DOUBLE 867 |

860

EVENT_SCRIPT

| EVENT_SCRIPT_ID DOUBLE 881 |
|---|
| EVENT_SCRIPT_STATE TEXT(1) (FK) 882
SCRIPT_GROUP_ID DOUBLE 883
SCRIPT_LABEL TEXT(40) 884
EVENT_NAME TEXT(80) 885
CREATE_DATE DATE 886
CREATE_USER DOUBLE 886
MODIFIED_DATE DATE 887
MODIFIED_USER DOUBLE 887 |

880

EVENT_META_PROPS

| EVENT_META_ID DOUBLE (FK) 871
VAR_CODE DOUBLE (FK) 872 |
|---|
| VAR_VALUE TEXT(200) 873 |

870

EVENT_SCRIPT_PROPS

| EVENT_SCRIPT_ID DOUBLE (FK) 891
VAR_CODE DOUBLE (FK) 892 |
|---|
| VAR_VALUE TEXT(200) 893 |

PARTICIPANT_SERVICE_QUEUE

PARTICIPANT_SERVICE_TYPE TEXT(1) (FK) 982
PARTICIPANT_ID DOUBLE (FK) 983
MESSAGE TEXT(200) 984
CREATE_DATE DATE 985

980

PARTICIPANT_DATA

PARTICIPANT_ID DOUBLE (FK) 911

GENDER TEXT(1) (FK) 912
INCOME_RANGE TEXT(1) (FK) 913
MARITAL_STATUS TEXT(1) (FK) 914
NUM_KEY DOUBLE 915
ALPHA_KEY TEXT(50) 916
LAST_NAME TEXT(25) 917
FIRST_NAME TEXT(25) 918
MIDDLE_INITIAL TEXT(1) 919
NAME_PFX TEXT(6) 920
NAME_SFX TEXT(6) 921
DATE_OF_BIRTH DATE 922
PREFERRED_ADDRESS TEXT(1) (FK) 923
PREFERRED_PHONE TEXT(1) (FK) 923
PREFERRED_EMAIL TEXT(1) (FK) 925

910

PARTICIPANT_EMAIL

PARTICIPANT_ID DOUBLE (FK) 931
EMAIL_TYPE TEXT(1) (FK) 932
EMAIL TEXT(200) 933

EMAIL_FORMAT TEXT(1) (FK) 934
EMAIL_STATUS TEXT(1) (FK) 935
CREATE_DATE DATE 936
CREATE_USER DOUBLE 936
MODIFIED_USER DOUBLE 937
MODIFIED_DATE DATE 937

930

PHONE

PARTICIPANT_ID DOUBLE (FK)
PHONE_TYPE TEXT(1) (FK)
PHONE_NBR TEXT(30)

PHONE_STATUS TEXT(1) (FK)

955

ADDRESS

PARTICIPANT_ID DOUBLE (FK) 941
ADDRESS_TYPE TEXT(1) (FK) 942

STATE_CODE TEXT(2) (FK) 943
COUNTRY_CODE TEXT(3) (FK) 944
ADDRESS_STATUS TEXT(1) (FK) 945
ADDRESS_1 TEXT(80) 946
ADDRESS_2 TEXT(80) 946
CITY TEXT(50) 947
POSTAL_CODE TEXT(20) 948
REGION TEXT(50) 949
PROVINCE TEXT(50) 950

940

SCRIPT_GROUP_PROPS

PARTICIPANT_ID DOUBLE (FK) 971
SCRIPT_GROUP_ID DOUBLE 972
VAR_CODE DOUBLE (FK) 973

VAR_VALUE TEXT(200) 974

970

LAST_CONTACTED

PARTICIPANT_ID DOUBLE (FK) 961

EMAIL_DATE DATE 962
PHONE_DATE DATE 963
STANDARD_MAIL_DATE DATE 964

960

METHOD AND SYSTEM FOR FACILITATING MARKETING DIALOGUES

CROSS-REFERENCE TO RELATED APPLICATIONS

This application is a continuation of, and claims a benefit of priority under 35 U.S.C. 120 of the filing date of U.S. patent application Ser. No. 11/818,192 by inventors Brian Reistad, William D. Snapper, Andrew C. Payne and James Campbell entitled "Method and System for Facilitating Marketing Dialogues" filed on Jun. 13, 2007, which issued as U.S. Pat. No. 7,647,372 on Jan. 12, 2010; which is a continuation of U.S. patent application Ser. No. 11/353,792 by inventors Brian Reistad, William D. Snapper, Andrew C. Payne and James Campbell entitled "Method and System for Facilitating Marketing Dialogues" filed on Feb. 14, 2006, which issued as U.S. Pat. No. 7,389,320 on Jun. 17, 2008; which was a continuation of U.S. patent application Ser. No. 09/621,913 by inventors Brian Reistad, William D. Snapper, Andrew C. Payne and James Campbell entitled "Method and System for Facilitating Marketing Dialogues" filed on Jul. 24, 2000, which issued as U.S. Pat. No. 7,127,486 on Oct. 24, 2006. The entire contents of each of the above-referenced applications are hereby expressly incorporated by reference for all purposes.

TECHNICAL FIELD

This invention relates to methods and systems for interactive marketing and for conducting interactive marketing.

BACKGROUND

Prior to the rise in popularity of the Internet, limited direct response marketing efforts existed, primarily in non-electronic channels. Marketers engaged in targeting and segmentation efforts, but the marketing involved little if any interactivity. The marketer sent out materials, and for the most part the customers and potential customers either purchased items or did not. The rise in popularity of the Internet led to the use of electronic mail (e-mail) marketing efforts. The use of e-mail led to an increase in the personalization of marketing efforts and to more sophisticated list management. Through e-mail, some marketers also permitted some customers and potential customers to "opt-in" (or "opt-out") of marketing efforts. This provided a rudimentary level of interactivity.

However, even with opt-in procedures, existing marketing efforts still permit very little interactivity between the marketer and the customers. The ability for marketers easily to alter what is sent to customers, when customers receive marketing materials, and how often they receive materials, is still very limited. Marketers have very limited ability to engage in two-way communications with their customers, or to engage in continuous or long-term dialogues with their customers. In addition, the ability to alter the type of communications (such as e-mail, regular mail, or telephone contact) or substance of communications in accordance with a customer's wishes or responses (or lack of responses) is very limited. Marketers also have a limited ability to alter communications based on trends in the results of current marketing efforts.

SUMMARY

According to an embodiment of the present invention, a marketer (or any other person or entity) is able to set up and communicate with potentially large numbers of customers (or potential customers, or other participants receiving a communication), where communications may involve waiting for, or receiving responses to, communications, and sending subsequent communications (or taking other actions) that depend, for example, on the responses, information known (or surmised) about an individual participant or any number of other factors.

More particularly, an embodiment of the present invention may allow marketing dialogues to be carried on with a set of participants by sending a communication to each of the participants. Based on this communication another set of participant may be assembled from the initial participants, for example based on an event such as a response to the initial communication, the passage of a certain amount of time, an interaction with the initial communication, etc. An action may then be taken with respect to this second set of participants. The action may be, for example, based on the event used to determine the second set of participants. The system may be operated in conjunction with a message managing system, such as described in commonly-assigned patent application Ser. No. 09/621,719, now U.S. Pat. No. 6,732,185, filed Feb. 14, 2000, entitled "Method and System for Managing Message Passing," which is incorporated herein by reference.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIGS. 4a and 4b are representations of a structure for use with an embodiment of the present invention.

FIGS. 8a and 8b are representations of structures for use with an embodiment of the present invention.

FIGS. 9a and 9b are representations of structures for use with an embodiment of the present invention.

FIG. 10 is a representation of structures for use with an embodiment of the present invention.

DETAILED DESCRIPTION

Figure 1:
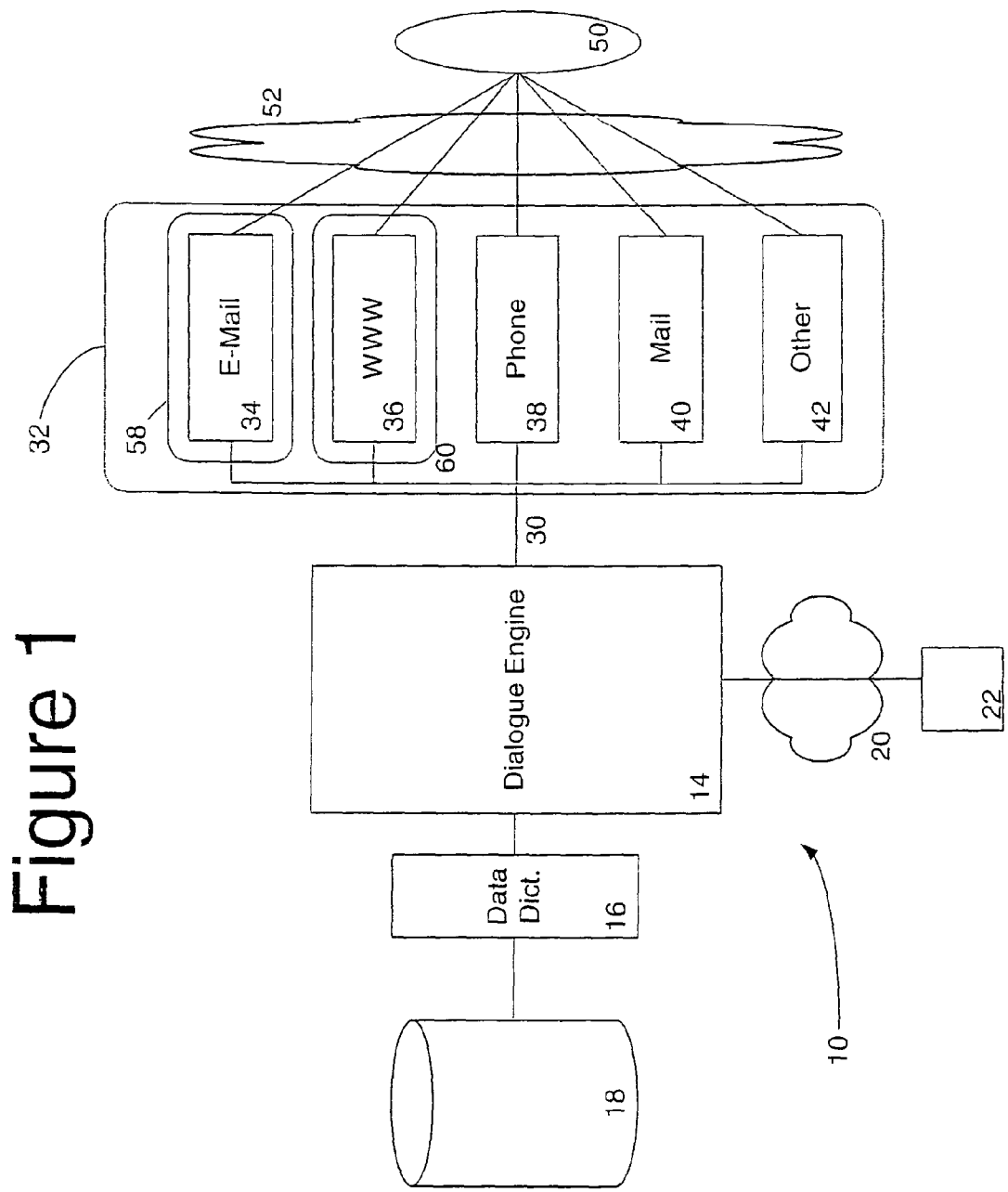
FIG. 1 is a block diagram of a system according to an embodiment of the present invention.

Referring to FIG. 1, dialogue system 10 includes dialogue engine 14, data dictionary 16, and database system 18. Dialogue engine 14 communicates with marketers over network 20, which in this example is the Internet. However, a local area network or other network could be used for communications between the marketers and dialogue system 10. Preferably, dialogue engine 14 runs on an Intel 700 MHz or higher processor, running Windows NT or 2000, and database system 18 includes Oracle 8i running on an Intel 700 MHz or higher processor running Windows NT or 2000, or a Sun SPARC Ultra 10 or higher processor running Sun Solaris.

Marketers, using browser-based clients 22, set up marketing scripts and monitor the results. Preferably, the marketers are able to perform these functions using just their browser, possibly with a plug-in or other small downloaded software. In preferred embodiments, the functions are performed through the use of HTML or Java-based programs.

Dialogue engine 14 communicates through XML interface 30 with communications channels 32, such as e-mail channel 34, World Wide Web (Web) channel 36, telephone channel 38, regular mail channel 40, and other channels 42. E-mail channel 34 permits e-mail communications with participants 50 over network 52 (which, in the case of the Internet, may be the same network as exemplary network 20; however, network 20 and network 52 may be different). Web channel 36 permits communications with participants 50 through the World Wide Web and participants' browsers. Telephone channel 38 sets up queues for telephone calls to be made to participants 50. Regular mail channel 40 permits the automatic or semi-automatic generation of post cards, letters, or other pieces of mail to be sent to participant 50. Other communication channels 42 can include, for example, facsimile, or pager or other wireless communications. Preferably, e-mail channel 34 is run through SMTP e-mail server 58, which in a preferred embodiment includes an Intel 700 MHz or higher processor running Windows NT or 2000, or Linux. Web channel 36 preferably is run through web server 60 with similar processor and operating system as e-mail server 58.

Clients 22 provide a user interface 100 (FIG. 2) for generating scripts. Preferably, user interface 100 provides drag-and-drop capabilities for adding specific function shapes 102 to a script. Function shapes 102 include logical shapes 104, e-mail output shapes 106, and other outputs shapes 108. Logical shapes 104 include begin shape 110, end shape 112, goto script shape 114, decision shape 116, delay shape 118, sample/segment shape 120, fatigue check shape 122, permission check shape 124, send to database shape 126, and repeat shape 128. E-mail shapes 106 include send message shape 140, send question shape 142, send newsletter shape 144, and send coupon shape 146. Other outputs shapes 108 include queue call shape 150 and queue mail shape 152. Of course, additional or alternative shapes can be used, as appropriate for a particular application.

In a preferred embodiment, in order to build a script, a user can drag a specific shape from a palette of shape options 160 onto a script screen 162. Preferably, when starting a new script, script screen 162 is pre-populated with begin shape 110. The output(s) (if any) for each shape appear as the shape is dragged onto script screen 162. The user can then drag the end of an output (such as end 164) to the input point (such as point 166) of the next shape in sequence, in order to "connect" two shapes. When a new script is created, the user optionally can specify when a script should be stopped, such as on a specified date or after a specified number of participants have gone through it. The user also may use script templates to create quickly the basic form of a script.

A script begins with begin shape 110 and ends with one or more end shapes 112, where an end shape 112 is used to indicate the end of a path through a script. Alternatively, other shapes also can end a path, without a separate end shape. Preferably, each shape has a single input point (except begin shape 110, which has no input) and one or more outputs (except end shape 112, which has no output). Nonetheless, with loops (such as repeat shape 128) or optionally with shapes in general, an output from each of multiple shapes can lead to a single input point.

When a shape is selected (for example, by double-clicking on it), an option window 200 appears (FIG. 3) that permits the user to provide a caption for the shape, if appropriate; captions for output options, where there are multiple outputs; and variables (along with discrete values for those variables) to be evaluated by or used by that shape. Option window 200 will look different, and have different options, for different shapes. Alternatively, option window 200 can appear automatically when the shape is dragged onto script screen 162.

Logical shapes generally control the flow of the script. For example, goto script shape 114 causes the current script to jump to another location in the script, or to terminate and starts up another script, as a continuation of the existing dialogue.

Figure 2:
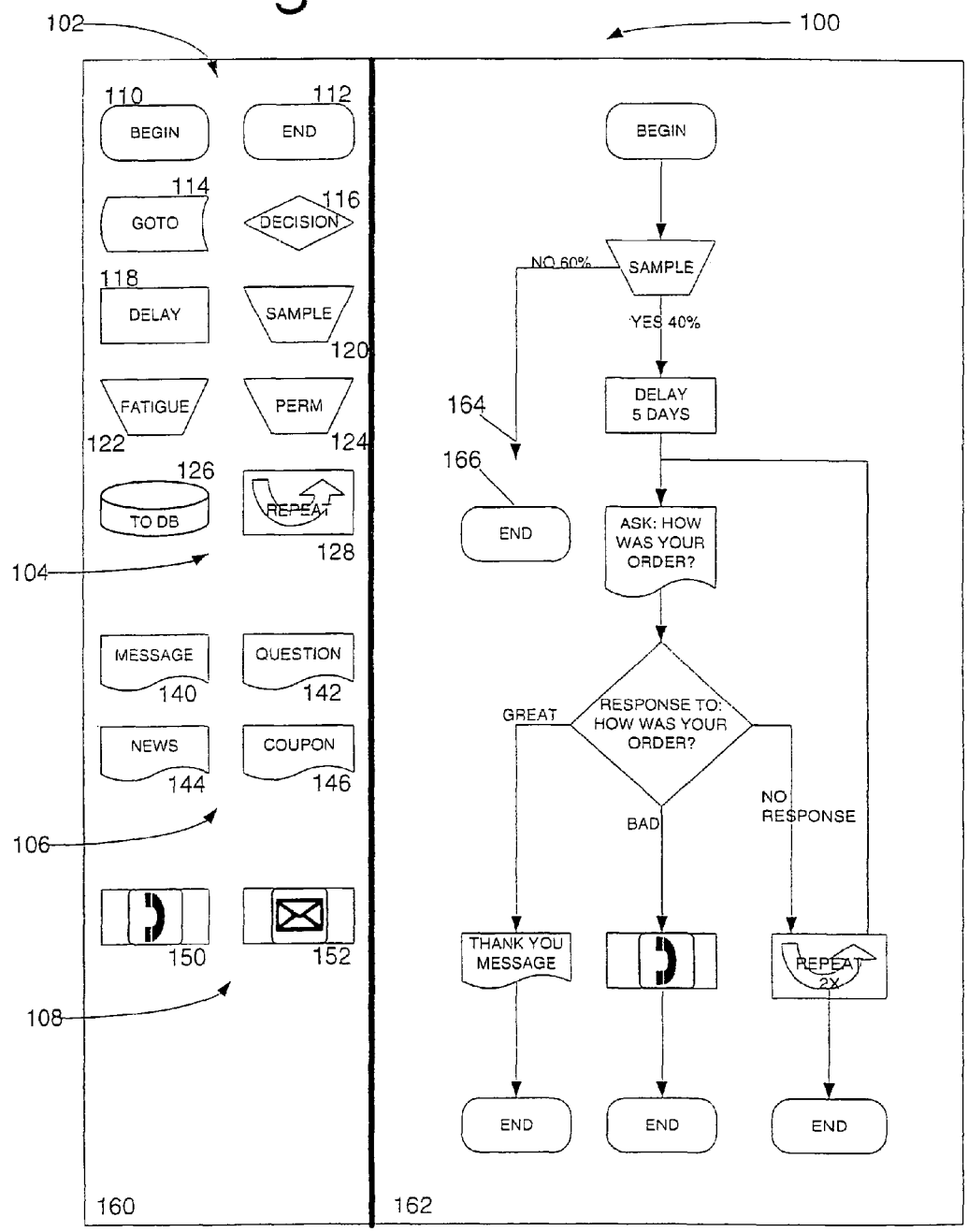
FIG. 2 is a representation of a structure for use with an embodiment of the present invention.
Figure 3:
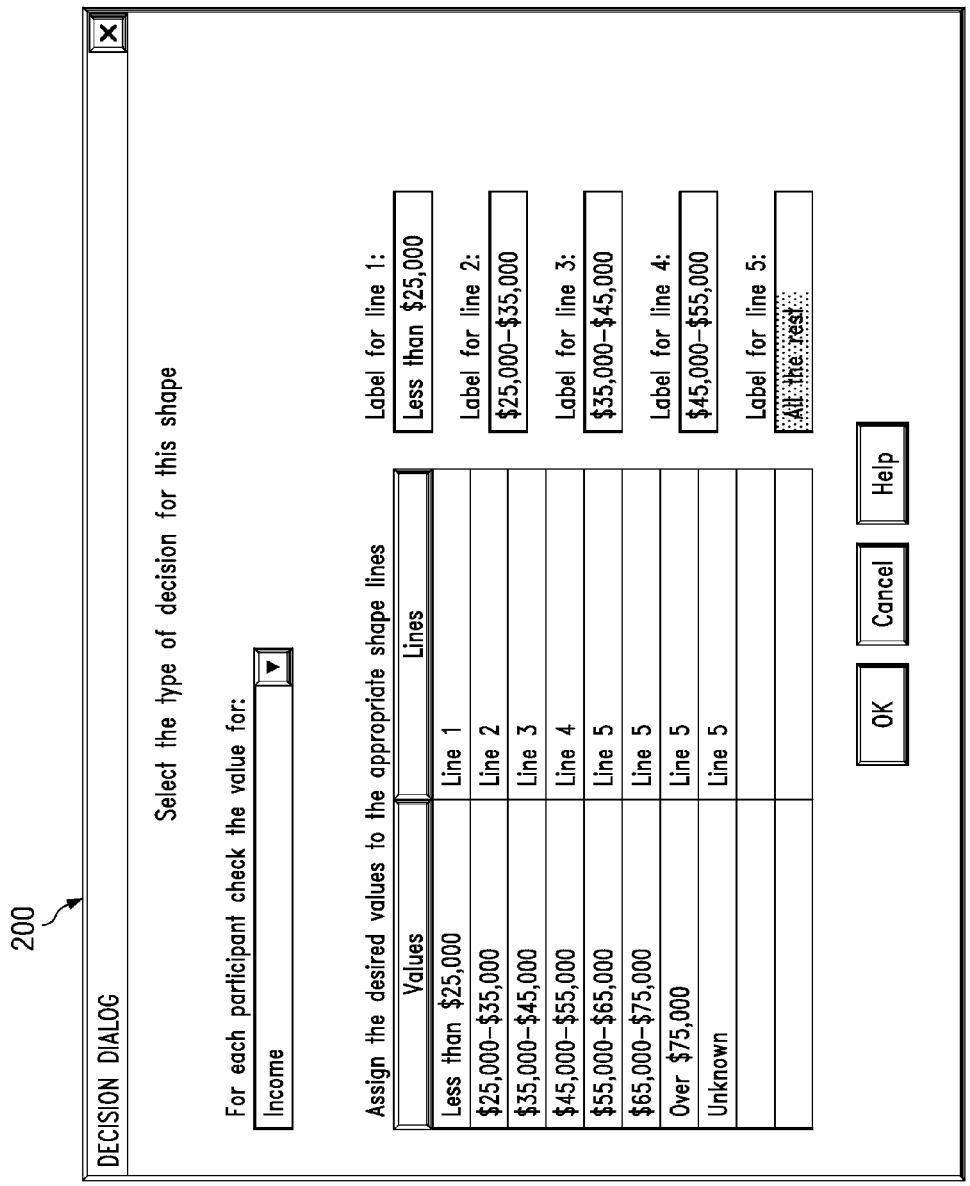
FIG. 3 is a representation of a structure for use with an embodiment of the present invention.

Decision shape 116 is used for branching. For example, as shown in FIG. 2, decision shape 116 causes the script to branch depending on the response to a prior question. When a decision shape 116 is dragged onto script screen 162, the option window (FIG. 3) permits the user to identify the response or other information on which the decision is being made and the value or values that should lead to each branch. Although FIG. 3 shows a decision being made based on a single variable, decisions also could incorporate Boolean logic or other mechanisms to permit multiple variables to be considered within a single decision shape. Alternatively, multiple decision shapes 116 can be used, in sequence, to cause branching to depend on multiple variables.

Delay shape 118 provides for a pause before the next shape is processed. For example, delay shape 118 can wait until a specified event occurs, such as the publication of a new book by Stephen King, or can wait until a specified date (such as April 15, the day after Thanksgiving, two weeks before Father's Day, or 14 days after a call was made as a result of a queue call shape 150). In these cases, option window 200 permits the user to define the event. Delay shape 118 also could be used after sending an e-mail, to provide for a 10-day pause before the next step is executed. In this case, option window 200 would permit the user to define the length of the delay. However, in many cases the send question shape (described below) will be used to provide a maximum period to wait for a response to an e-mail.

Also, delay shape 118 can be defined to wait until a specified combination of events occurs, such as until a response is received from an e-mail or 10 days elapse, whichever comes first. If the time period elapses, the response can then be recorded as "no response," so that the appropriate decision shape branch can subsequently be taken. That is, the dialogue can be set up to provide for alternatives if the participant fails to respond within a specified period of time.

Sample/segment shape 120 allows a specified sample of a population to be selected. For example, a marketer might want to ask a certain question only to (for example) 10 percent of its customers, so that it is not overwhelmed by the volume of responses. As another example, this shape can be used so that the population is divided into different groups, with each group receiving a different offer or other communication. This allows the marketer to assess the effectiveness of different communications. In these cases, option window 200 would permit the user to define the percentage of respondents to be routed to each branch, and to provide a caption for each branch. Although two branches are shown in FIG. 2, a sample/segment shape 120 could have more than two branches, so that, for example, 10 percent of the participants are directed down a first branch, 30 percent of the participants are directed down a second branch, and the remaining 60 percent are directed down a third branch. In a preferred embodiment, when executed, a sample/segment shape 120 will cause a random number to be generated each time a participant reaches the shape. The number is normalized to a number between 0 and 99, and the selected percentages are used to determine, from the number, which branch is taken.

Fatigue check shape 122 is used to prevent the same communication from being sent to a participant too frequently. For example, fatigue check shape 122 can be used to ensure that a participant who is in multiple dialogues with the same script (which may occur, for example, if a script is run every time a participant purchases an item from an online store) does not receive a certain e-mail if it has received the same e-mail (from an earlier dialogue) within the past 14 days. Preferably, fatigue checking is done against the shape that comes after fatigue check shape 122. Alternatively, option window 200 can permit the user to select the specific instance (or instances, if the same shape is used multiple times in a script in a sufficiently similar way) of a shape to check against and the time period. When executed, if the participant has received (for example) the designated e-mail within the designated period, the dialogue will delay until the end of the period before moving on to the designated shape.

Permission check shape 124 is used to determine whether a participant meets specified criteria to proceed down a given branch. It is a specialized version of decision shape 116. For example, permission check shape 124 might be used to determine whether a user has decided to opt out of receiving certain types of messages or messages from certain channels. Permission check shape 124 also can be used to determine whether a user has a preferred channel, so that messages will be directed to that channel, if possible.

Send to database shape 126 is used to store responses or other data into a specified external database.

Repeat shape 128 is used to create loops. For example, to cause a series of steps to repeat 2 times (so that the series of steps execute in total 3 times), the user would select a repeat value of "2" in option window 200.

E-mail shapes 106 generally determine the type of e-mail that will be sent to participants. For example, send message shape 140 is used to send a message, where no response is requested from the participant. Option window 200 allows the user to define the text of the e-mail, by typing in the text or by identifying a file containing the text of the e-mail, and the type of e-mail (such as plain text format or HTML format). Preferably, the text of the e-mail is included as part of the body of the e-mail, rather than as an attachment. In one embodiment, each e-mail shape includes a "not sent" branch, to account for situations where the message is not sent (such as, if the participant has no e-mail address or the system determines not to send the message).

Send question shape 142 is used to send an e-mail, where a response is requested. In this case, option window 200 allows the user to define the name(s) and types of the variable(s) that will hold the value or values of one or more responses to one or more questions. The user can define the specific responses that are permitted (that is, the participant receives a set of options and is permitted to select one or more) for each question or can permit any value to be entered as, for example, a textual or numerical value. In addition, the user can define a time period after which the script assumes that the participant will not respond. Thus, in the example in FIG. 2, decision shape 116 is based on the response to send question shape 142, and the third branch is selected if the participant does not respond within 7 days. Alternatively, send question shape 142 can have branches to reflect whether a response is received or not, with decision shape 116 then providing branches for the different responses that could be received. Preferably, option window 200 permits the user to designate the database or databases to which the responses will be stored.

Send newsletter shape 144 is used to send an e-mail with an attachment or with a link to a URL. This shape may be used to send a newsletter or other document to a participant. The attachment can be a text, picture, video, sound, or other type of file. Option window 200 permits the user to identify the file or URL. Optionally, more than one attachment or URL can be specified.

Send coupon shape 146 is used to send a coupon to the participant. The user is able to define a nominal amount of the coupon (by dollar amount or percentage), the expiration date, and any other restrictions (such as, the coupon can only be used on weekends, with a minimum purchase amount, or for certain specified goods). A mechanism for altering the nominal amount of a coupon is discussed below.

Alternatively, one or more of these e-mail shapes (such as message shape 140 and send question shape 142) can be combined into a single shape, with options that allow for these variations. As a further alternative, the send question shape and the decision shape can be combined into a single shape, where the options in each of these shapes are selected as part of the single shape. Also, the functionality of permission check shape 124 can be included within one or more of the e-mail shapes (or with other messaging shapes). With each of the e-mail shapes, the e-mail can be personalized based on the participant's name or other demographic information, or based on other information, such as the participant's prior purchase history.

Queue call shape 150 and queue mail shape 152 are used to schedule telephone calls and regular mail. Thus, for example, queue call shape 150 can be used to queue calls for telemarketers or others, and queue mail shape can be used to define a letter, post card, or other document to be sent to the participant.

Preferably, additional shapes can be added at any time, shapes can be modified, and variables can be added to shapes (either by creating a new shape or modifying the existing shape). To do this, the user informs the system that a new (or modified) shape is available, and through a dynamic loading process (as is generally well known in the art) the system recognizes the new shape and makes it available to browser-based clients 22. By using this "plug-and-play" type of functionality, a user also is able to add new channels to a system. For example, by adding a queue fax shape or a send wireless message shape, a user could add a new messaging channel.

Figure 4A:
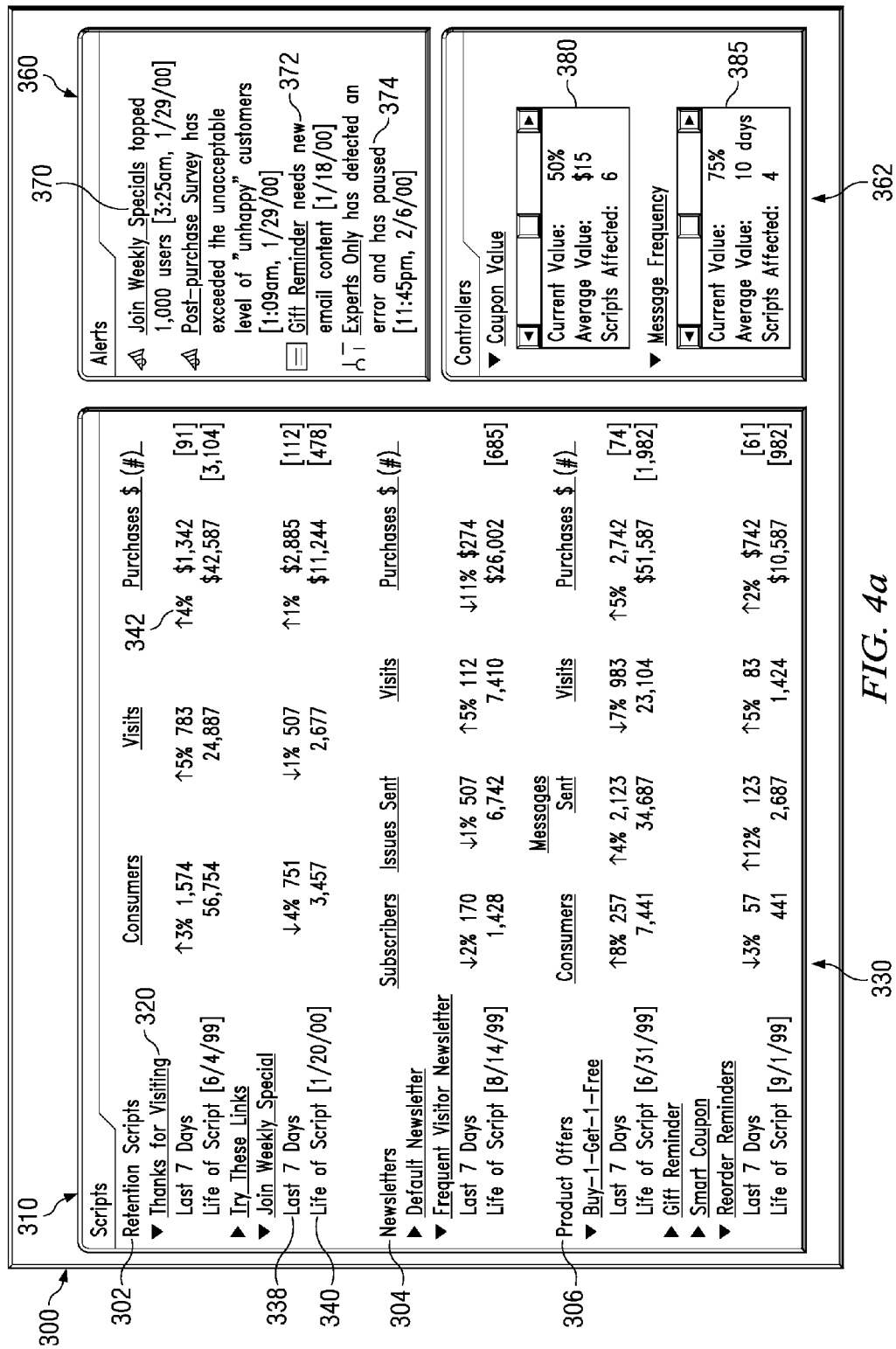

As shown in FIGS. 4a and 4b, monitoring console 300 provides a user interface for monitoring the status of running scripts on a macro level. In the example shown in FIG. 4a, scripts 310 are divided into three groups for ease of viewing: retention scripts 302, newsletters 304, and product offers 306. However, any other groupings, or no groupings, could be used. By clicking on the script name 320, the user is able to view detailed information about the script, including the script itself, a description of the script, the events relevant to that script, and all of the accumulated data for that script. The user is able to view the information described below, but limited to the designated script. In addition, the user may edit or stop the script. In one embodiment, if a script is edited while one or more dialogues have not completed for that script, the script is closed to new participants, existing participants continue to interact with the original script, and a second version of the script is created, with which new participants interact. Alternatively, existing participants can interact with the revised script, as long as the script accounts for possible inconsistencies between steps that have already taken place and future steps that have been changed.

Where the script is currently running, user-selectable data 330 is provided for the script. The data presented for each grouping may be different, reflecting the relevant data to be monitored. Thus, in this example, for retention scripts 302, monitoring console 300 lists the number of consumers for whom the script has run or is running, the number of visits to the web site in response to a communication as part of the script, and the amount of purchases (in both dollars and number) resulting from visits. Monitoring console 300 could also list, for example, the number of participants for which the script has begun or the number of participants for which the script has completed. Monitoring console 300 also could provide statistical information, such as how a certain number compares to a goal (by percentage, for example). For running scripts, this information is provided in this example both for the last 7 days (line 338) and for the life of the script (line 340). For the "last 7 days" line, monitoring console 300 also provides a running trend 342, indicating the percentage increase or decrease (for example, for the last 7 days versus the previous 7 days).

With other types of scripts, other data may be more appropriate to be listed in monitoring console 300. For example, for a newsletter, the data may include the number of subscribers, the number of issues of the newsletter sent, the number of visits to the web site from viewing the newsletter, and the amount of resulting purchases. For product offers, the data may include the number of consumers for whom the script has run or is running, the number of messages sent (such as specific products offers sent), the number of resulting visits, and the amount of resulting purchases. Alternatively, data for scripts that are no longer running can continue to be listed, or data can only appear after the script has run a minimum number of times.

As shown in FIG. 4b, monitoring console 300 can take a different form, in which each script 310 is listed, along with its status 370 (described below), and information such as the total number of dialogues (conversations), the number of active conversations, the number of e-mails sent by that script, the number of e-mails opened by participants in that script, the number of question responses received, the number of links clicked, and the number of completed conversations. The number of total conversations should equal the number of active conversations plus the number of completed conversations. Preferably, as shown in FIG. 4b, monitoring console 300 also provides totals 390 for all scripts, a "new" button 394, and a "refresh" button 396. New button 394 switches the user to user interface 100 for generating a new script. Refresh button 396 causes the data shown in monitoring console 300 to be updated (refreshed). Where a script is still in progress, its status preferably is shown as "in design" or something similar.

As shown in FIG. 4a, monitoring console 300 preferably also provides an alerts section 360 and controllers 362. In alerts section 360, user-defined alerts appear. For example, a threshold alert 370 can appear when a number exceeds a certain threshold, such as when the number of consumers exceeds 1000, or some other milestone. The alerts may, but need not, relate to data otherwise appearing on monitoring console 300. A reminder alert 372 can appear when a script should be updated, has expired, has stopped or been paused, or otherwise needs to be reviewed. A system alert 374 indicates a processing or similar type of error, which requires attention.

Controllers 362 provide the user with an ability to adjust certain user-selectable parameters on an individual or macro level. In a preferred embodiment, coupon controller 380 permits the user to adjust the amount of each coupon by a designated percentage. Thus, for example, if the nominal value of a coupon is $10 or 10%, the coupon value can be increased or decreased by an appropriate percentage. As an example, a user could adjust coupons up by 50% if sales are low, or down 50% if sales are exceeding expectations but the margins are low. This permits coupons for all scripts (or selected scripts) to be adjusted easily, without editing each affected script. Preferably, coupon controller 380 displays the current value of the coupon adjustment off the nominal values, the average value of the coupons affected by the controller, and the number of scripts affected by adjustments in the coupon values.

Similarly, in a preferred embodiment, message frequency controller 385 permits the user to adjust the frequency of messages subject to a delay because of delay shape 118. Like coupon controller 380, message frequency controller 385 permits the user to adjust the length of a delay. Thus, for example, if the nominal value of a delay is 10 days, the delay can be increased or decreased by an appropriate percentage. As an example, a user could adjust delays up by 50% if the data in monitoring console 300 suggests that users are frustrated from receiving too many messages or need more time to consider a prior message. Preferably, message frequency controller 385 displays the current value of the frequency adjustment off the nominal values, the average value of delays affected by the controller (which could be all delays, from all scripts, or just select delays), and the number of scripts affected by the adjustments.

Figure 5:
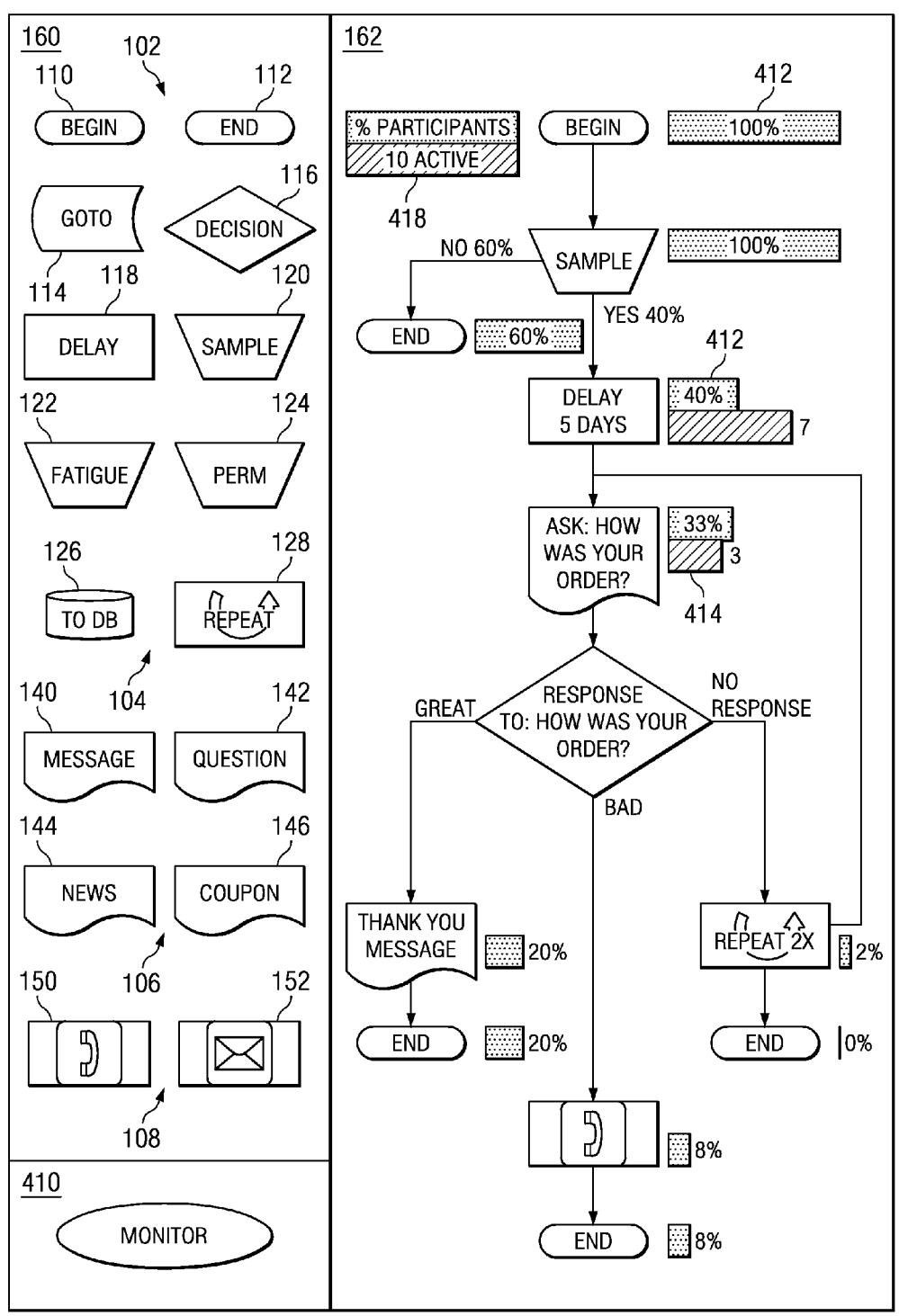
FIG. 5 is a representation of a structure for use with an embodiment of the present invention.

Optionally, as shown in FIG. 5, some monitoring functions can be combined with the view of the scripts, as shown in FIG. 2. In this case, by selecting a monitoring function, with monitoring toggle button 410, the system overlays over each shape in script screen 162 the percentage of participants 412 that have reached that point in the script, and the number of participants 414 currently at each step in the script. The percentage figure can be for the life of the script or for a designated time period. When the monitoring function is active, script screen 162 also displays the total number of active participants 418. The total number of active participants is the sum of the numbers of participants at each step in the script.

Once a script is completed, it is compiled into a set of instructions and executed by dialogue engine 14. Each shape in a script will yield a set of instructions when the script is compiled, where each instruction contains a command from a set of script operations available to dialogue engine 14. Preferably, the script operations are Java classes, however other languages, whether object-oriented or not, may be used, such as C++ or C. The script itself may be in one of several states. Preferably, the script states include "active" (the script is running), "closed" (the script is running but is closed to new participants), "paused" (the script is being edited or is otherwise frozen), and "archived" (the script is stopped or otherwise no longer in use).

Figure 6:
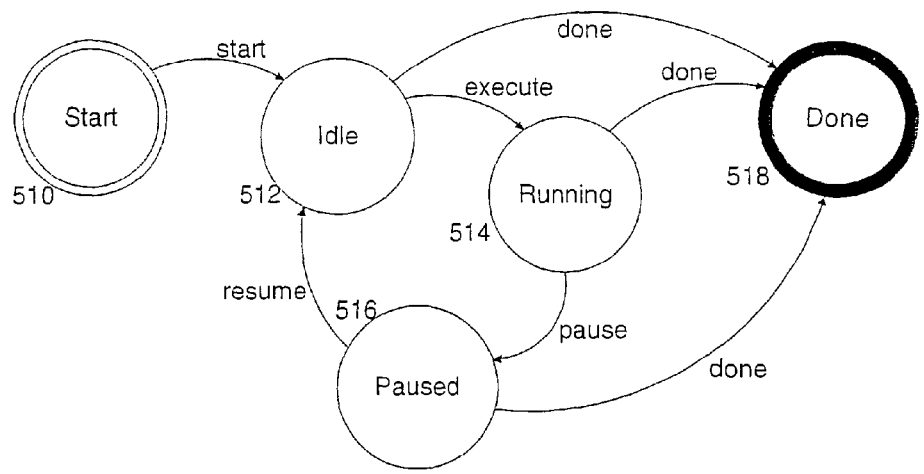
FIG. 6 is a state diagram for a structure for use with an embodiment of the present invention.

At any given point in time, each dialogue for a script may be in one of several states. Preferably, as shown in FIG. 6, the dialogue states include "start" 510 (when a dialogue begins), "idle" 512 (an event [If any] necessary for the dialogue to move to the next step has occurred, and the dialogue is waiting for the dialogue engine to process the next step) "running" 514 (the dialogue is running), "paused" 516 (the dialogue is waiting for an event), and "done" 518 (the dialogue has ended). A dialogue will not be in the idle state 512 if the script is not running (for example, if it is paused). Once the dialogue has been initialized, it will be in the idle state.

Figure 7:
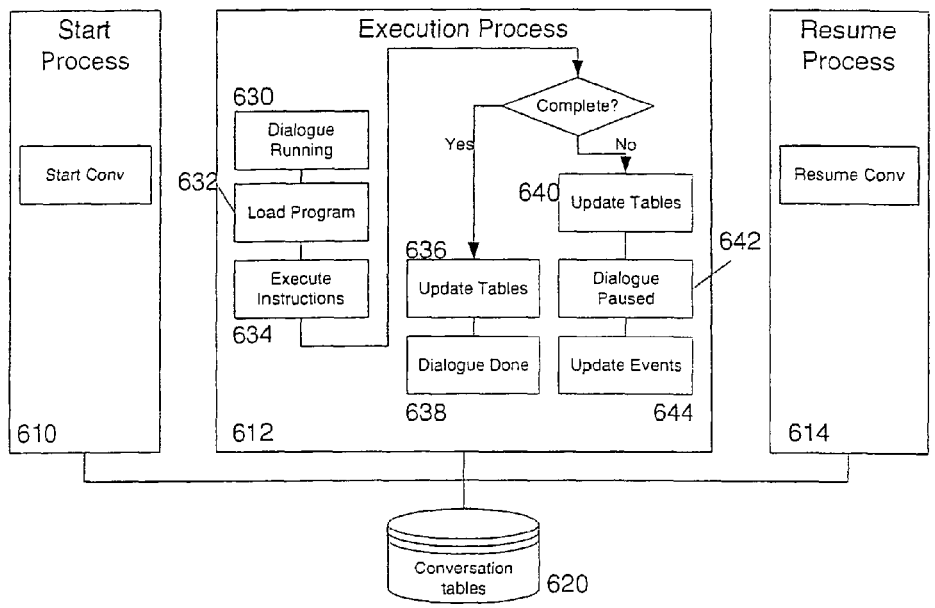
FIG. 7 is a block and flow diagram of structures used and steps performed according to an embodiment of the present invention.

Dialogue engine 14 accesses various database tables (described below) in order to execute and keep track of each dialogue. Preferably, in order to execute dialogues, dialogue engine 14 uses three processes, where multiple instances of each process can exist. As shown in FIG. 7, start process 610, execution process 612, and resume process 614 each communicate with dialogue database tables 620.

Start process 610 starts a dialogue by creating a conversation object in the database. In a preferred embodiment, start process 610 creates a new entry in conversation table 710 and new entries in conversation properties table 740 for the variables that may be used. These entries may include event parameters supplied with the event. For example, if the purchase of a book is the event that starts a dialogue (conversation), then the name of the book being published may be added to the conversation properties table as, in effect, a constant. These tables are described below and shown in FIG. 8. In addition, start process 610 may, where a script can be closed after a designated number of participants, decrement a counter to indicate the number of participants that may still be added to the script (relative to the number in script regulator table 785). Start process 610 may be, for example, an event handler that responds to an external event such as a purchase in the marketer's e-commerce system. Start process 610 also may be responsive to the instructions corresponding to a goto script shape 114 from another script. In that case, start process 610 also would copy any appropriate parameters from entries for the originating dialogue to the new dialogue. In addition, start process 610 can be a manual process, for testing a script from a graphical or other user interface.

Execution process 612 is responsible for executing a dialogue. Preferably, this process is an NT Service or UNIX daemon, which continually looks for idle dialogues in conversation table 710. Upon finding an idle dialogue, execution process 612 marks that dialogue as running (that is, changes its state from idle to running in conversation table 710), as indicated in step 630 in FIG. 7, and loads the program corresponding to the script into memory (step 632). Execution process 612 then executes the sequence of instructions starting with the current instruction, as obtained from conversation table 710, until the script completes or pauses (step 634). The script will have completed if it reached an end (or other final) shape in the script or encounters an error, and will have paused if (for example) it reached a delay shape 118. If the dialogue is complete, execution process 612 updates the appropriate database tables 620 (step 636) and marks the dialogue as done (step 638). If, on the other hand, the dialogue has paused, execution process 612 updates the appropriate database tables 620 (step 640), marks the dialogue as paused (step 642), and updates conversation wait table 730 (step 644) to indicate the events that will cause execution of the dialogue to resume (that is, the events that will cause the dialogue state to change to idle). Specifically, wait table 730 receives a new entry or row for each event for which the dialogue is paused. Each entry includes the conversation ID, an event key, and the next instruction to be executed if that event occurs. The database tables that could be updated at steps 636 or 640, when a dialogue is completed or paused, include conversation properties table 740 (which lists the values of dialogue variables) and any appropriate participant tables 900, which include demographic and other participant information.

Resume process 614 is responsible for resuming a dialogue. This is typically an event handler that reacts to the arrival of an event from an external system. For example, if one of the events is the publication of a new book by a specified author or about a specified topic, resume process 614 updates conversation table 710 to mark as idle each entry with an event label that matches the label of the event being handled, and updates the next instruction field in conversation table 710 with the next instruction to be executed. This instruction is the instruction from the row in conversation wait table 730 that corresponds to the event that occurred. The dialogue is now available to execution process 612 to continue the execution. Resume process 614 also deletes all rows in conversation wait table 730 with the conversation ID of that dialogue. Preferably, each event includes a priority to control which dialogues are transitioned to idle first.

A number of tables relating to dialogues or conversations are shown in FIG. 8a. Conversation table 710 preferably provides an entry (or row) for each dialogue (conversation). Conversation table 710 preferably includes fields (or columns) for dialogue or conversation ID 711 (a unique ID for each dialogue), script instance ID 712 (an identifier for the particular version/instance of the script being run for this dialogue), conversation state 713 (the state of the dialogue, such as paused, idle, or running), conversation source ID 714 (to identify the event or other script by which the participant got into the dialogue), participant ID 715 (a unique identifier for the participant), creation information 716 (the date the conversation was created and the user who created it), modification information 717 (the date the conversation was last modified, and the user who last modified it), current label 718 (a label for the current instruction), priority 719 (a relative priority of a dialogue; dialogues with higher priority will be executed before dialogues with lower priority), current instruction number 720 (the current instruction), original source ID 721 (identifies the first dialogue in the chain of dialogues that led to the current dialogue), previous conversation ID 722 (Identifies the previous dialogue in the chain), test 723 (identifies whether the dialogue is being used for testing), and trace 724 (identifies whether each instruction executed will be logged).

If the same participant is in multiple dialogues (one might start, for example, each time the participant purchases another item), possibly in the same script, each of these dialogues has its own dialogue ID 711 but the same participant ID 715. In this and in other tables, preferred names for fields (columns) are indicated, along with a preferred type for the name (such as "double," "text," or "date"). A number in parentheses for a text field indicates a preferred length of the field, and the designation "FK" indicates a foreign key, that is that the field is a link to a field in another table.

Conversation wait table 730 preferably provides an entry for each event that can cause each paused dialogue to change to an idle state. Wait table 730 preferably includes columns for dialogue or conversation ID 732 (corresponding to the dialogue ID in conversation table 710), event key 734 (an identifier for the event), and next instruction 736 (the next instruction to run if the event identified by event key 734 occurs). There can be multiple entries for a single dialogue, where there are multiple events (such as a response to a message or a date) for which that dialogue is waiting. Preferably, event key 734 is in the form of a string or integer, with a prefix (designated EVENT_HANDLER_PFX) that identifies the type of event (such as a date, or a response to a message) and a unique identifier (designated EVENT_UUID). The same event may appear in multiple entries, if more than one dialogue is waiting for the same event (such as a specific date or the publication of a book by a specific author). The next instruction 736 may be different for each event for the same dialogue (or some or all of the next instructions may be the same), and is the instruction that will be placed in the conversation table 710 if the corresponding event occurs.

Conversation properties table 740 preferably provides an entry for each variable that is local to each dialogue. Thus, each dialogue that corresponds to the same script will have entries that list the same variable, and a dialogue may have multiple entries if it corresponds to a script with multiple variables. Properties table 740 preferably includes columns for dialogue or conversation ID 742 (corresponding to the dialogue ID in conversation table 710), variable code 744 (the name of or a code for the variable, or a link to a table with entries for each variable), and value 746 (the value of the variable, such as the value determined from a participant's response to a question). For example, a dialogue may ask a participant whether he or she liked the book recently purchased, whether the participant is satisfied with the level of service, and (if not satisfied) why not. The response field will be filled with a value representing the options available to the participant in responding (such as "yes" or "no," a price range, a level of satisfaction, or a text field filled with a participant's textual response to a question). Preferably, the response field also can have a value indicating that the participant did not respond at all (such as, if the time to respond expired before a response was received) and a value indicating that the participant declined (or failed) to answer the question, but responded to the communication.

Some tables relating to scripts are shown in FIG. 8b. Script table 750 preferably includes an entry for each version of each script. Script table 750 preferably includes columns for script instance ID 751, script state 752 (the state of the script, such as active, closed, paused, or archived), script group 753 (an identifier for a particular script, which is common to all revisions of that script), script revision 754 (the particular revision of the script, preferably with separate columns for major and minor revision numbers), script name 755, description 756, start and stop dates 757 for the script, creation information 758, and modification information 759.

Script properties table 760 preferably includes an entry for pieces of additional information (such as, meta-data) about the script. This table preferably includes columns for script instance ID 761, code 762 (an identifier for the particular information, such as "goal" of a script), and value 763 (the value of the code, such as "increase purchases" or "obtain registration").

Preferably, labeled scripts table 765 provides a label (name) for a script which refers to the latest version of that script. Labeled scripts table 765 preferably includes columns for script instance ID 766, label text 767 (the label, such as "current"), creation information 768, and modification information 769.

Script source table 770 preferably provides source code information for the script. Script source table 770 preferably includes columns for script instance ID 771 and XML 772, where XML is the script in text form. This could be, for example, the XML version of the script that is displayed graphically (as represented, for example, in FIG. 2). Alternatively, XML field could be an identifier for the text form of the script, and other languages can be used to describe the script.

Migrate table 775 preferably is used to record links between related versions of a script. This can be used to move (migrate) a participant from a previous version of a script to the next version. Migrate table 775 preferably includes columns for a migration ID 776, the previous version's script instance ID 777, the new version's script instance ID 778, the migration status 779 (such as active or inactive), creation information 780, and modification information 781.

Script regulator table 785 preferably is used to keep track of queues for scripts with a limited number of participants or that otherwise can be closed automatically. When the script closes, the table is used to determine how to handle subsequent potential participants. Script regulator table 785 preferably includes columns for script group ID 786, script label 787, regulator code 788 (a code for the type of regulator imposed on the script, such as a date when the script closes or a maximum number of participants), limit 789 (the numeric limit, for scripts with a numeric limit), queue 790 (an indicator of whether additional potential participants are queued for when the limit is no longer exceeded), and cutoff date 791 (the cutoff date, for scripts with a cutoff date).

The database also includes program related tables, as shown in FIG. 9a, which preferably include instruction table 810, instruction properties table 815, script entry point table 820, script operation table 825, and script operation properties table 835.

Instruction table 810 preferably matches instructions with the corresponding operations. Instruction table 810 preferably includes entries for each instruction appearing in any script, with columns for instruction ID 811 (a unique identifier for the instruction), script operation ID 812 (the operation to which the instruction corresponds), script instance ID 813 (the particular script instance in which the instruction is found), and label 814 (a label for the instruction).

Instruction properties table 815 preferably includes information about the properties of the variables used by an instruction. Instruction properties table 815 preferably includes columns for instruction ID 816, code 817 (the instruction variable, such as a "wait" variable that determines how long a script will wait to receive a response to an e-mail message), and value 818 (the value for code 817, such as "7 days," if this instruction will wait 7 days for a response).

Script entry point table 820 preferably includes an entry for each instruction that can begin a script. This table preferably includes columns for the instruction ID 821 and for an entry point label 822 (such as "begin"). Among other things, this table permits the use of multiple entry points for a script.

Script operation table 825 preferably provides a list of the operations known to the system. It preferably includes columns for script operation ID 826, operation status 827 (such as, "active" or "inactive," to permit certain operations to be inactivated), operation name 828, class 829 (the Java or other class to execute to perform the operation), creation information 830, and modification information 831. Although operations preferably are executed as Java classes, other programming languages can be used with appropriate changes made to this table.

Script operation properties table 835 preferably includes information about properties of each operation for a particular installation, such as a name that the system provides for a variable and the corresponding internal name for that installation. This table preferably includes columns for script operation ID 836, code 837 (the property), and value 838 (its value, such as the internal name).

The database preferably also includes event-related tables shown in FIG. 9b. Event meta table 860 preferably provides a list of all events known to the system. This table preferably includes columns for event ID 861, event type 862 (the type of event, such as "book purchase"), event name 863, description 864, start script indicator 865 (an indicator of whether this event can start a script), creation information 866, and modification information 867.

Event meta properties table 870 preferably includes entries for each variable associated with an event from event meta table 860. Event meta properties table 870 preferably includes columns for event ID 871, code 872 (a name or code for the event), and value 873 (a description of the event represented by code 872).

Event script table 880 preferably lists the events that are configured to start dialogues (conversations) in scripts. This table preferably includes an entry for each script started by each event, with columns for event script ID 881 (an identifier for the event), event script state 882 (such as, "active" or "inactive," where an inactive state signifies that the event cannot be used to start a script), script group ID 883 (the script that will be started), script label 884 (such as "current"), event name 885 (a name for the event, such as "book purchase"), creation information 886, and modification information 887. Where an event can start multiple scripts, it will have multiple entries in this table.

Event script properties table 890 preferably provides name/value pairs for each event appearing in event script table 880. This table preferably includes columns for event script ID 891, code 892 (a name or code for event), and value 893 (a description of the event represented by code 892).

Additional tables may be used to store statistical information about scripts, such as the number of times a script has run, the number of times each step in a script has run, and the number of pending dialogues at each step in a script. This information can be maintained for the life of a script and for various periods (such as the past 7 days and the 7 days before that). Also, tables may be used to log information about messages, such as e-mails sent and e-mails opened, click-throughs on links included with messages, and other data relating to interactions with participants.

The database preferably also includes tables relating to participants, as shown in FIG. 10. These may include participant data table 910, which preferably maintains the main demographic information about each participant.

It preferably has columns for participant ID 911 (as appears in conversation table 710), gender 912, income range 913, marital status 914, numeric key 915 and alphanumerical key 916 (keys to numerical or alphanumerical identifiers for the same participant in legacy databases of the user), last name 917, first name 918, middle initial 919, name prefix 920 (such as Mr., Ms., Dr., etc.), name suffix 921 (such as Jr., or III), date of birth 922, preferred address 923 (a key to the preferred address from address table 940), preferred phone 924 (a key to the preferred phone number from phone table 950), and preferred e-mail 925 (a key to the preferred e-mail address from e-mail table 930). This table is used, for example, to insert the participant's name and other information in an e-mail or letter, and to determine which address or phone number to use for messages.

Participant e-mail table 930 preferably has entries for each e-mail address for each participant. It preferably has columns for participant ID 931, e-mail type 932 (such as home or work), e-mail text 933 (the actual e-mail address), e-mail format 934 (such as html or plain text), e-mail status 935 (such as "inactive," if a prior e-mail was returned as undeliverable), creation information 936, and modification information 937.

Similarly, address table 940 preferably has entries for each address for each participant. It preferably has columns for participant ID 941, address type 942 (such as home or work), state code 943 (the 2 digit abbreviation for the state portion of the address), country code 944 (a 3 digit abbreviation for the country portion of the address), address status 945 (such as "inactive" if regular mail could not be delivered), address 946 (which can be 2 or more columns, to provide for 2 or more lines of an address), city 947, postal code 948, region 949 (where appropriate for the participant's country), and province 950 (where appropriate for the participant's country).

In a like manner, phone table 955 preferably has entries for each phone number for each participant. It preferably has columns for participant ID 956, phone type 957 (such as home, work, or cellular), phone number 958 (the actual number, including area code and any country or similar codes needed for international dialing), and phone status 959 (such as "inactive" if the number has been disconnected).

Last contacted table 960 preferably includes information about recent correspondence with a participant. Preferably, it includes an entry for each participant, and includes participant ID 961, the last e-mail date 962, the last phone date 963, and the last regular mail date 964. Where other channels are used, additional columns can be included for those channels.

Script group properties table 970 preferably is used to store values for use by fatigue check shape 122 or any other shape-specific participant variable (discussed below). This table preferably includes entries for each relevant script and shape for each participant. Multiple entries will exist if the participant has been in different scripts or there are multiple shape-specific variables in a single script. It preferably has columns for participant ID 971, script group ID 972, code 973 (the variable), and value 974 (the value for that variable). With, for example, fatigue check shape 122, the variable (such as last message date) is updated when a message for a particular script is sent, regardless of the dialogue.

Participant service queue table 980 preferably is used by queue call shape 150 and queue mail shape 152 for messages to be sent by these channels. This table preferably includes columns for participant service type 982 (a code for the type of service), participant ID 983, message text 984 (the text of the message to be sent), and create date 985 (when the message was created). The message text field alternatively can identify a file or other location where the message is located, or the script to be used for a telephone call. If other channels are used, such as facsimiles, then participant service queue table 980 preferably also is used for those channels.

Other or different tables, many of which are conventional for keeping information about participants (such as their purchase history or web pages they visited), may be included among the participant tables. Alternatively, participant tables 900 can be completely or partially embodied in a company's existing database systems.

Data dictionary 16 is used to simplify access by dialogue engine 14 and the script-writing user interface 100 to participant data (that is, data corresponding to participant tables 900) in database system 18. Often, this will be data used to make participant-specific decisions, such as that males get one message and females a different message, or that recent buyers get one discount and others get a different discount. Also, the data may be used to construct personalized mailings. This data may exist in a combination of internal and external databases. Internal databases can include the databases described above for dialogue and script information, and any participant tables using the same database system. These database tables are known to and accessible by the dialogue engine. External databases can include a company's proprietary customer (or similar) database, or any other database external to the dialogue system. Often, these databases will have an unknown format and will not be accessible directly by the dialogue engine. An external database also could include an LDAP server or other data server having a standard format.

Data in the various databases may be "fixed" or "computed." Fixed data exists in a database table, such as the gender of a participant, a participant's state of residence, or the date of a participant's last purchase. Computed data is derived using one or more computations. For example, whether a participant is a "recent buyer" may depend on a calculation based on the date of the participant's last purchase—if the last purchase was within 30 days the participant may be considered a recent buyer.

Data variables may have "discrete" or "continuous" values. Examples of discrete data variables include gender (male, female, or unknown) and favorite season (spring, summer, fall, winter, or unknown). Continuous data variables could have essentially any value, such as the last purchase date, age, or income, although in practice the number of possible values for a continuous data variable is not limitless.

Fixed, discrete data variables have a name and a set of possible values. Therefore, decisions can be made by considering each of the possible values. Similarly, computed discrete data variables (such as whether a participant is a frequent buyer) permit decisions to be made by considering each of the possible values.

To make decisions based on fixed, continuous data variables, it will often be preferred to categorize the data into a set of discrete values. For example, "income" could be divided into a set of dollar ranges (with the highest being a certain amount or over). Similarly, continuous, computed data variables can be categorized into a set of discrete values. For example, "average annual purchase" could be categorized into "zero," "low," "medium," and "high" ranges to facilitate decision-making. Alternatively, decisions on continuous variables can be made by using algebraic and/or Boolean expressions. For example, one branch could be taken if the expression is "true" or a value exceeds a certain amount, with another branch taken in the alternative. Of course, more than two branches could be used.

In general, the data variables stored by the system can be divided into six categories. Data variables can be global, participant-dependent, or dialogue-dependent. Each of these three categories, in turn, can be shape-specific or not shape-specific. A global variable is the same for all participants across all dialogues. An example of a shape-specific global variable is a variable that identifies the first 10 participants who have responded to a message, and example of non-shape specific global variables are a variable indicating the current date or a variable indicating the location of an image. An example of a shape-specific participant variable is a variable that identifies when a participant last received an e-mail (for use, for example, by the manage fatigue shape), and examples of non-shape specific participant variables are demographic information, such as name, e-mail address, and age. An example of a shape-specific dialogue variable is a repeat counter used for a repeat shape, and an example of a non-shape specific dialogue variable is a response to a specific question asked in an e-mail. Preferably, each of these categories is treated differently. For example, separate instances of each dialogue-specific variable must be maintained for each separate dialogue, but only one instance of a participant-specific variable should be maintained for each participant (although a separate shape-specific variable would be maintained for each distinct shape).

Figure 11:
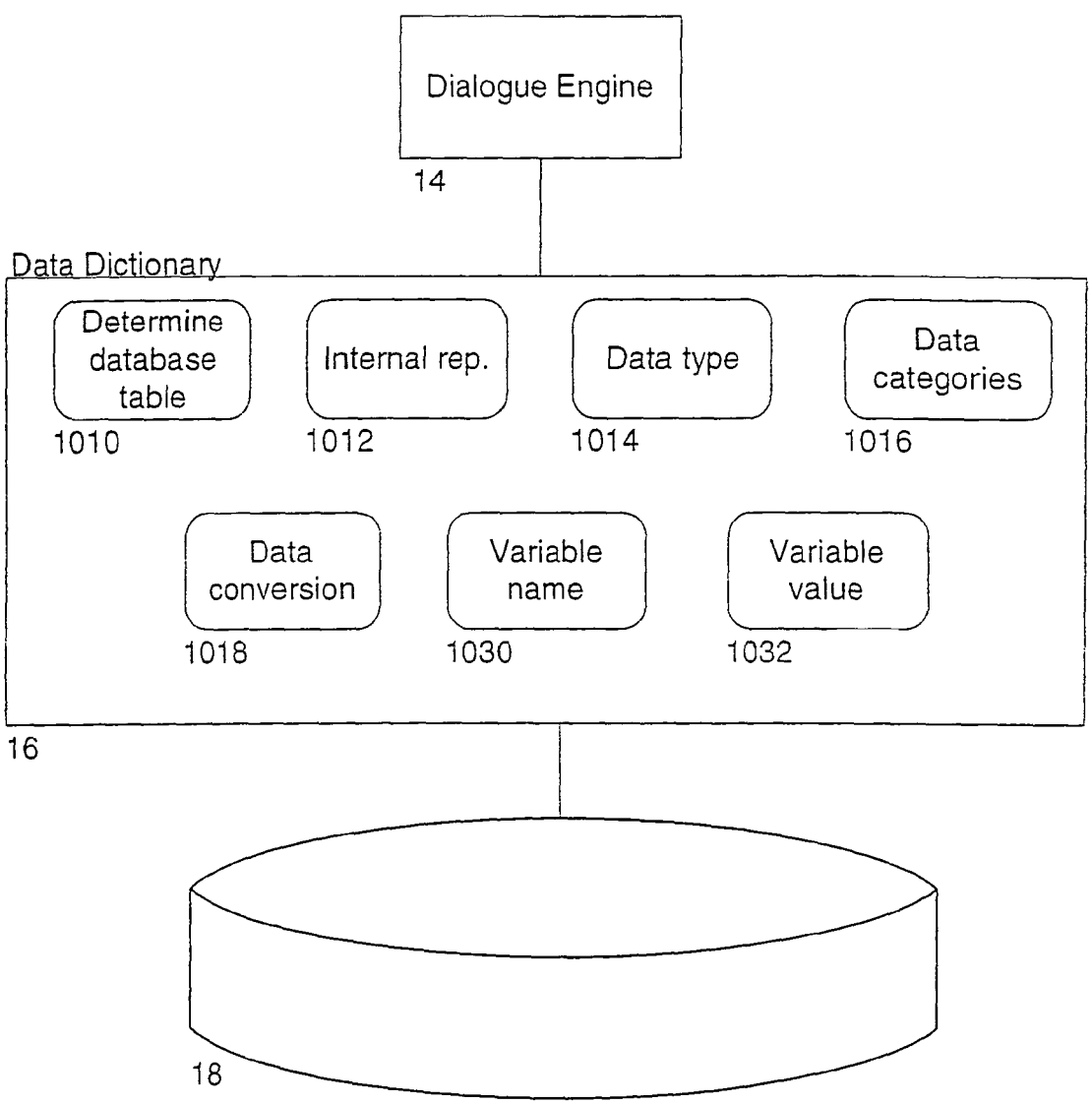
FIG. 11 is a representation of a structure for use with an embodiment of the present invention.

As shown in FIG. 11, data dictionary 16 uses methods to take an external name for the variable (that is, the name by which the variable is known by the dialogue engine), and determine the database table in which each variable is stored (method 1010), the internal representation (method 1012) of the variable (that is, the name by which the variable is known in the database table), the data type (method 1014), and the data categories (that is the discrete values that the data can have, for use by the dialogue system) (method 1016). Data dictionary 16 also provides methods for converting the data between the format in which it is stored and the format in which it is used by the dialogue system (method 1018). For computed data variables, data dictionary 16 also provides methods to determine the name of each variable used in the calculation (method 1030) and to compute the value of the variable (method 1032). Preferably, users can add additional methods to data dictionary 16 through a dynamic loading process, as discussed above with regard to adding shapes and channels.

While there have been shown and described examples of the present invention, it will be readily apparent to those skilled in the art that various changes and modifications may be made therein without departing from the scope of the invention as defined by the following claims.

For example, different database tables can be used, or a different database structure. Also, while the system has been described in terms of marketing activities, the present invention is applicable to other activities in which it is desired to engage in numerous dialogues with multiple participants. Accordingly, the invention is limited only by the following claims and equivalents thereto.

What is claimed is:

1. A method for facilitating a network based dialogue, comprising:
    obtaining a set of first corresponding participants at a server configured with a first program;
    executing a first instruction of the first program, wherein the first program is associated with each of the first corresponding participants, the first instruction is operable to send a first communication to each of the set of first corresponding participants;
    assembling a set of second corresponding participants, wherein each of the set of second corresponding participants is in the set of first corresponding participants;
    determining that a first specified event has occurred in conjunction with each of the set of second corresponding participants, wherein the set of second corresponding participants is assembled by determining the occurrence of the first specified event in conjunction with each of the set of second corresponding participants; and
    executing a second instruction in conjunction with each of the second set of participants, wherein the second instruction is associated with a first action to be performed in conjunction with each of the second corresponding participants.

2. The method of claim 1 wherein the first specified event is an interaction with the first communication.

3. The method of claim 2, wherein the first communication is an email.

4. The method of claim 3, wherein the interaction is clicking on a link within an email.

5. The method of claim 1, wherein the first specified event is the expiration of a specified time period.

6. The method of claim 1, wherein the second instruction corresponds to the first program.

7. The method of claim 1, wherein the first action is sending a second communication to each of the set of second corresponding participants.

8. The method of claim 7, wherein the second communication occurs on a different channel than the first communication.

9. The method of claim 1, wherein the set of first corresponding participants is obtained from an interaction between each of the set of first corresponding participants and a web site.

10. The method of claim 1, wherein the first action comprises storing the set of second corresponding participants.

11. The method of claim 10, wherein the first action further comprises recording responses to first communication.

12. The method of claim 11, further comprising determining a number of responses to the first communication.

13. The method of claim 10, further comprising
obtaining the set of second corresponding participants; and
executing a third instruction of a second program in conjunction with each of the second corresponding participants, wherein the third instruction is associated with a second action to be performed in conjunction with each of the second corresponding participants.

14. The method of claim 13, wherein the second action is sending a second communication to each of the set of second corresponding participants.

15. The method of claim 14, wherein the second communication occurs on a different channel than the first communication.

16. The method of claim 1, wherein the server is coupled to a storage device storing information associating each of the first set of participants with a corresponding state of a dialog and wherein the method further comprises updating the information to reflect occurrence of the first event for each of the second set of participants.

17. The method of claim 1, wherein the server is coupled to a database storing a table associating each of the first corresponding participants with a corresponding state of a dialog; and
updating the database to reflect occurrence of the first event for each of the second set of participants.

18. The method of claim 1, further comprising providing a first interface for a dialog engine running on the first server to a first communication channel, and wherein executing the first instruction of the first program causes the dialog engine to interface with the first communications channel to cause the first communications channel to send the first communication to the set of first corresponding participants.

19. The method of claim 18, wherein executing the second instruction causes the dialog engine to interface with the first communications channel to cause the first communications channel to send a second communication the set of second set of corresponding participants.

20. The method of claim 18, further comprising providing a second interface for the dialog engine to a second communication channel, and wherein executing the second instruction causes the dialog engine to interface with the second communications channel to cause the second communications channel to send a second communication the set of second set of corresponding participants.

21. An electronic dialog system comprising:
a data storage location;
a dialog computer interfaced with the data storage location and a communications channel, the dialog computer comprising a processor and a tangible computer readable medium storing instructions executable to:
obtain a set of first corresponding participants;
execute a first instruction of a program, wherein the program is associated with each of the first corresponding participants, wherein the first instruction causes the dialog computer to communicate with the communications channel to prompt the communications channel to send a first communication to the set of first corresponding participants;
determine that a specified event has occurred for a set of second corresponding participants, wherein the set of second corresponding participants is in the set of first corresponding participants;
execute a second instruction of the program to cause the dialog computer to take a first action in conjunction with each of the corresponding participants; and
store a set of data at the data storage location that tracks the state of a dialog.

22. The electronic dialog system of claim 21, further comprising an email server coupled to the dialog computer, and wherein the dialog computer communicating with the first communications channel further comprises communicating with the email server to cause the email server to send a first email to the set of first corresponding participants.

23. The electronic dialog system of claim 22, wherein the first action comprises causing the dialog computer to communicate with the email server to cause the email server to send a subsequent email to the set of second corresponding participants.

24. The system of claim 23, wherein the event is an interaction with the first email.

25. The method of claim 23, wherein the first specified event is the expiration of a specified time period.

26. A computer program product comprising a tangible non-transitory storage medium storing computer program instructions executable to perform a method comprising:
provide a dialog engine and an interface to a communications channel;
loading a set of instructions corresponding to a script;
interfacing with the data storage location to retrieve a set of data, wherein the dialog engine interfaces with the data storage location using the interface to the data storage location;
assembling a set of first corresponding participants;
executing a first instruction of a program corresponding to the set of first corresponding participants to cause the dialog engine to communicate with the communications channel to prompt the communications channel to send a first communication to the set of first corresponding participants, wherein the first instruction is executed with the dialog engine;
determining that a specified event has occurred with respect to a set of second corresponding participants, wherein each of the second corresponding participants is in the set of first corresponding participants; and
executing a second instruction of the program to take an action in conjunction with each of the second corresponding participants, wherein the second instruction is executed with the dialog engine.

27. The computer program product of claim 26, wherein the action comprises communicating with the communications channel using the interface to the communications channel to prompt the communications channel to send a second communication to the set of second corresponding participants.

28. The computer program product of claim 27, wherein the event comprises the expiration of a specified time period.

29. The computer program product of claim 28, wherein the interface to the communications channel comprises an interface to an email server.

* * * * *